(12) United States Patent
Boukari

(10) Patent No.: US 10,552,424 B2
(45) Date of Patent: Feb. 4, 2020

(54) PROCESS AND DEVICE FOR SEARCHING FOR A PLACE

(71) Applicant: Morou Boukari, Toulouse (FR)

(72) Inventor: Morou Boukari, Toulouse (FR)

( * ) Notice: Subject to any disclaimer, the term of this patent is extended or adjusted under 35 U.S.C. 154(b) by 372 days.

(21) Appl. No.: 14/739,426

(22) Filed: Jun. 15, 2015

(65) Prior Publication Data

US 2015/0363471 A1  Dec. 17, 2015

Related U.S. Application Data

(60) Provisional application No. 62/012,437, filed on Jun. 16, 2014.

(51) Int. Cl.
*G06F 17/00* (2019.01)
*G06F 16/2457* (2019.01)
*G06F 16/29* (2019.01)

(52) U.S. Cl.
CPC ........ *G06F 16/24575* (2019.01); *G06F 16/29* (2019.01)

(58) Field of Classification Search
None
See application file for complete search history.

(56) References Cited

U.S. PATENT DOCUMENTS

| | | | | |
|---|---|---|---|---|
| 8,018,458 B2 * | 9/2011 | Peterson | ........... | G06F 17/30241 345/418 |
| 8,478,278 B1 * | 7/2013 | Scott | ................. | H04M 3/42348 370/356 |
| 9,200,903 B1 * | 12/2015 | Kahn | ...................... | G01C 21/00 |
| 2006/0155581 A1 * | 7/2006 | Eisenberger | ........ | G06F 17/3089 705/3 |
| 2006/0227992 A1 * | 10/2006 | Rathus | .............. | G06F 17/30247 382/100 |
| 2006/0265361 A1 * | 11/2006 | Chu | .................. | G06F 17/30867 |
| 2007/0218900 A1 * | 9/2007 | Abhyanker | .......... | G06Q 10/087 455/435.1 |
| 2008/0010259 A1 * | 1/2008 | Feng | .................... | G06F 17/3087 |
| 2008/0091435 A1 * | 4/2008 | Strope | ........................... | 704/277 |
| 2009/0222438 A1 * | 9/2009 | Strandell | ............. | G06F 17/3087 |
| 2010/0305848 A1 * | 12/2010 | Stallman | ............. | G06F 17/3087 701/465 |
| 2011/0100903 A1 * | 5/2011 | Igarashi | ................... | C02F 3/348 210/601 |
| 2011/0137881 A1 * | 6/2011 | Cheng | ................... | H04W 4/021 707/706 |
| 2011/0153186 A1 * | 6/2011 | Jakobson | ............... | G01C 21/20 701/532 |
| 2012/0166432 A1 * | 6/2012 | Tseng | ................ | G06F 17/30867 707/728 |
| 2012/0197911 A1 * | 8/2012 | Banka | ............... | G06F 17/30864 707/752 |
| 2012/0284256 A1 * | 11/2012 | Mahajan | ................... | G06F 8/61 707/722 |

(Continued)

OTHER PUBLICATIONS

"Places with hot temperature over 80 f all year round", Google Search Exhibition 1, 2017.*

(Continued)

*Primary Examiner* — Hung D Le

(74) *Attorney, Agent, or Firm* — Young & Thompson

(57) ABSTRACT

Process for searching for a place on the basis of a free request (in natural language).

14 Claims, 3 Drawing Sheets

(56) References Cited

U.S. PATENT DOCUMENTS

| | | | | |
|---|---|---|---|---|
| 2012/0317087 | A1* | 12/2012 | Lymberopoulos | G06F 17/3053 707/706 |
| 2013/0132398 | A1* | 5/2013 | Pfeifle | G06F 17/30241 707/745 |
| 2013/0159106 | A1* | 6/2013 | Gross | G06Q 30/00 705/14.54 |
| 2013/0290331 | A1* | 10/2013 | Blumberg | G01C 21/20 707/736 |
| 2014/0122457 | A1* | 5/2014 | Walton | G06F 16/951 707/706 |
| 2014/0279261 | A1 | 9/2014 | Krishna Kolluri et al. | |
| 2014/0379696 | A1* | 12/2014 | Gyongyi | G06F 16/9537 707/722 |
| 2015/0057981 | A1* | 2/2015 | Gross | G01S 19/48 703/1 |
| 2015/0082183 | A1* | 3/2015 | Hale | G06F 17/30867 715/738 |
| 2015/0088792 | A1* | 3/2015 | O'Neill | H04L 67/10 706/12 |
| 2015/0088853 | A1* | 3/2015 | McDonald | G06F 17/30038 707/711 |
| 2015/0094097 | A1* | 4/2015 | Fraccaroli | H04W 4/021 455/456.3 |
| 2016/0098410 | A1* | 4/2016 | Ziezold | G06F 17/30666 707/724 |

OTHER PUBLICATIONS

"Countries with strong military and has over 1500 fighter aircrafts", Google Search Exhibition 2, 2017.*
Rodolphe Bauer, Preliminary Search Report, Institut National de la Propriete Industrielle, French Patent Application 1,555,430, dated Feb. 2, 2016.
Benjamin Adams et al., "Frankenplace: An Application for Similarity-Based Place Search," Conf. Proc. ICWSM 2012, Dublin, IR, Jun. 7, 2012, pp. 616-617.
Alfred A. Kuehn, et al., "High-Value PC-Based GIS Applications in Business," System Sciences, 1994, vol. IV: Information Systemss: Collaboration Technology Organizational Systems and Technology; Proceedings of the Twenty-Seventh International Hawaii Onference on Wailea, HI, Jan. 4-7, 1994, Los Alamitos, CA, IEEE Comp. Jan. 4, 1994, pp. 327-336.
Emile Bruenau et al., "Recherches Textuelles, Codage Automatique, Codage Assiste; Exemples," Courrier ds Statistiques, No. 81-82, Jun. 1, 2007, pp. 45-45.

* cited by examiner

PROCESS AND DEVICE FOR SEARCHING FOR A PLACE

The invention relates to a process for searching for a place on the basis of a free request (in natural language) defined by a user on a computer, characterized in that it includes:
- a step of spatially cutting the earth's surface into surface cells,
- a step of associating data with a surface cell in order to obtain data sub-sets,
- a step of storing the data sub-sets,
- a step in which the user forms the free request,
  - a step of analysis of the language and interpretation of the free request with the generation of keywords and conditions for searching, sorting and selecting said data sub-sets,
- a step of searching for surface cells associated with the data associated with the sorted and selected data,
- a step of displaying the place(s) corresponding to the surface cells found.

The invention also relates to a device enabling the process to be implemented.

Uses: Expediting the search for places.

FIELD OF USE OF THE INVENTION

This invention relates to the field of searching for a place and in particular to adaptations making it possible to perform said searches under the best conditions.

DESCRIPTION OF THE PRIOR ART

Normally, one may spend several days obtaining complete information on the destination of a place, in particular for a vacation. It is indeed necessary today to consult multiple sources of information, which are often incomplete and dispersed throughout the world.

DESCRIPTION OF THE INVENTION

The applicant has therefore conducted research intended to enable any person at any institution or organization (civil or military) to locate and choose a place in the entire world to stay temporarily, work, etc., without knowing the name of said place, but by transmitting wishes or desires of what the person would like to encounter, see, feel, live or do there and so on.

Another objective of the invention is to obtain this result very quickly and thus save an enormous amount of time by avoiding the need to consult multiple sources of information.

To do this, the applicant has imagined a new process for searching for a place on the basis of a free request (in natural language) defined by a user on a computer, which is characterized in that it includes:
- a step of spatially cutting the earth's surface into surface cells,
- a step of associating data with a surface cell in order to obtain data sub-sets,
- a step of storing the data sub-sets,
- a step in which the user forms the free request,
  - a step of analysis of the language and interpretation of the free request with the generation of keywords and conditions for searching, sorting and selecting said data sub-sets,
- a step of searching for surface cells associated with the data associated with the sorted and selected data,
- a step of displaying the place(s) corresponding to the surface cells found.

Such a reversal of the search makes it possible to very quickly provide the user of the process with a place or a plurality of places corresponding to the parameters defined.

Thus, by simply expressing a wish or desires, for example for activities, climatic, socioeconomic, political, military, safety, strategic, sanitary, and housing conditions, the user may obtain one or more places as a response.

The process of the invention enables accelerated searches and thus saves time. It also makes it possible to perform more complete searches.

This process requires the sorting, parameterization and storage of a large amount of data. Moreover, the applicant has advantageously imagined another process characteristic that is characterized in that it includes the production of data sub-sets, each having the following data fields:
- the geographic coordinates of the surface cell,
- the type of resource associated with said surface cell,
- the property of said resource,
- the noted property value,
- the temporal validity of the noted property value,
- the date/time of update of the preceding fields,
- the source/origin of the fields completed.

In order to make it possible to obtain a search result going beyond a search for vacation spots, but also in order to complement the latter, the applicant has advantageously imagined the creation of a sub-set of unreported data. Thus, according to another particularly advantageous feature, the resource type is political. Indeed, it should be noted that the destinations proposed and the destinations where it is, for example, dangerous to go may not match up. Such a difference requires the consultation of multiple information sites (for example a travel site and the site of the department of foreign affairs). The invention makes it possible to do without this type of resource so as to avoid the need to consult multiple sites.

According to another particularly advantageous feature, the resource type is military. Indeed, for military missions, it is important to know whether, in the location where it is envisaged to conduct military operations with a possible quick withdrawal of troops, there is/are:
- a military base for the country of origin of the troops, a military base for an ally country, a military base for an enemy country;
- logistics support cells for the country of origin of the troops, logistics support cells for an ally country, logistics support cells for an enemy country;
- intelligence officers for the country of origin of the troops, intelligence officers for an ally country, intelligence officers for an enemy country;
- hostilities among the local populations with regard to nationals of the country of origin of the troops.

According to another particularly advantageous feature, the resource type is educational. Such a data sub-set may satisfy requests concerning an education request.

According to another particularly advantageous feature, the resource type is sanitary. Such a data sub-set may complement responses to requests requiring the presence of a vaccine.

According to another particularly advantageous feature, the resource type is administrative. Such a data sub-set may complement responses to requests requiring administrative formalities.

According to another particularly advantageous feature, the resource type is political.

According to another particularly advantageous feature, the resource type is geopolitical and strategic.

The invention also relates to the device enabling said process to be implemented, and which is characterized in that it includes at least one server for storing said data sub-sets with which the data entry modules and search modules communicate.

More specifically, the device includes at least one so-called server unit containing a specific document database characterized in that it contains data sub-sets organized in bytes, each byte being comprised in particular of the data listed above for the sub-sets described above, connected by a digital network to at least one client computer having artificial intelligence for analysis and interpretation of the free request enabling it to interact with the user so as to collect a character string representing the free request and also provide the user with results in the form of multimedia documents (text, animated or still images, sound, 3D representations, etc.).

According to another feature, the device is characterized in that each surface cell or set of surface cells includes a plurality of sensors for measuring at least one of the data items sought.

The fundamental concepts of the invention disclosed above in their most basic form, other details and features will become more clear in view of the following description and the appended drawings, providing, by way of a non-limiting example, an embodiment of a device according to the invention.

DESCRIPTION OF A PREFERRED EMBODIMENT

Figure 1:
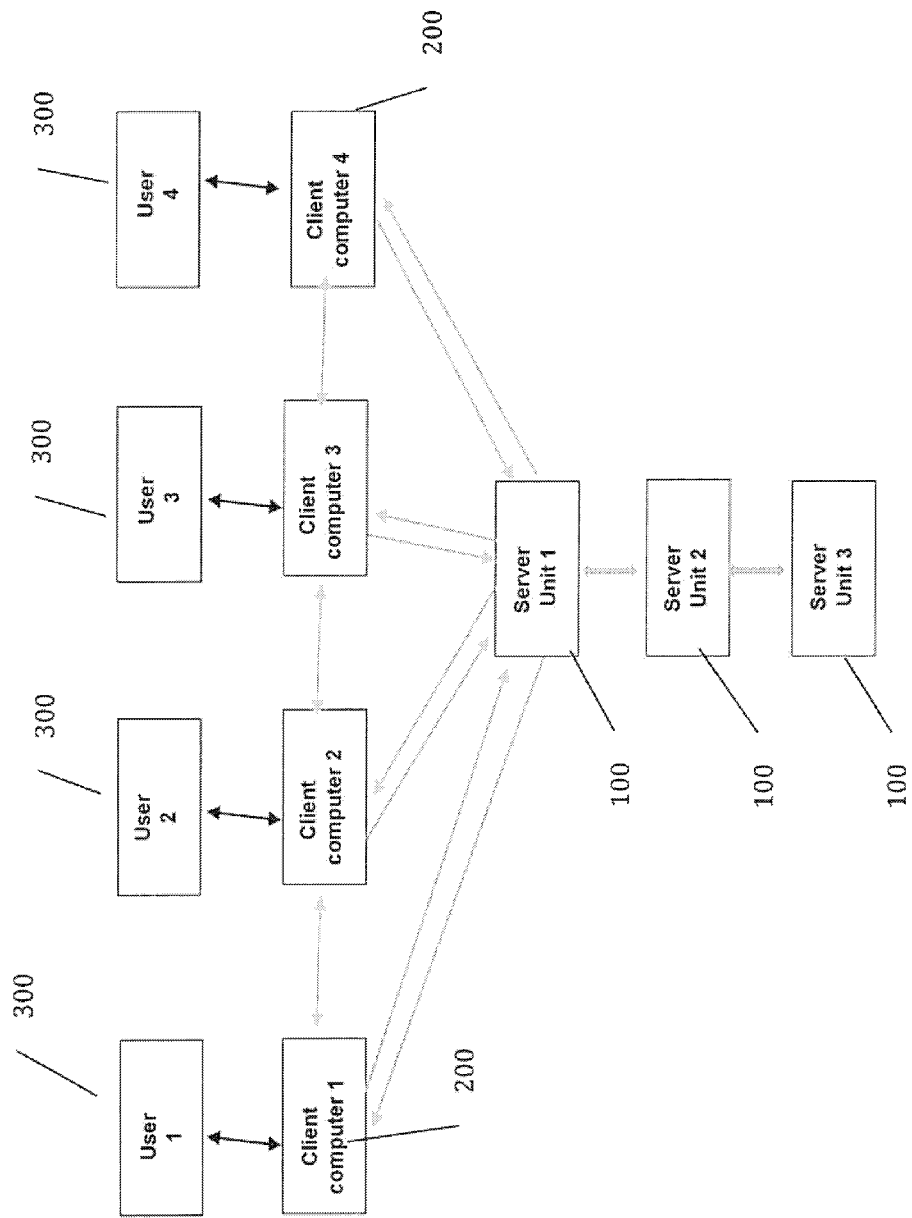
FIG. 1 is a diagram of an embodiment of a digital network according to the invention.

As shown in the drawing of FIG. 1, the reverse search device is comprised of at least one so-called server unit 100 (reference 3 here) containing a specific document database connected by a digital network to at least one client computer 200 having artificial intelligence for analysis and interpretation enabling it to interact with the user 300 so as to collect a character string representing the free request and also provide the user with results in the form of multimedia documents (text, still images, animated images, sound, 3D representation, etc.).

The data of the specific document database of the server unit are in the form of data sub-sets each forming a septuple, each septuple being comprised of:

a surface cell denoted S1 (not shown), obtained from the spatial cutting of the terrestrial globe into basic units;
the resource type denoted S2 associated with the surface cell S1,
the property of the resource denoted S3,
the value of the property denoted S4,
the temporal validity of the value of the property denoted S5 (not shown),
the date/time of update of the quintuple (S1, S2, S3, S4, S5) denoted S6 (not shown),
the source of said quintuple (S1, S2, S3, S4, S5) denoted S7 (not shown).

Figure 2:
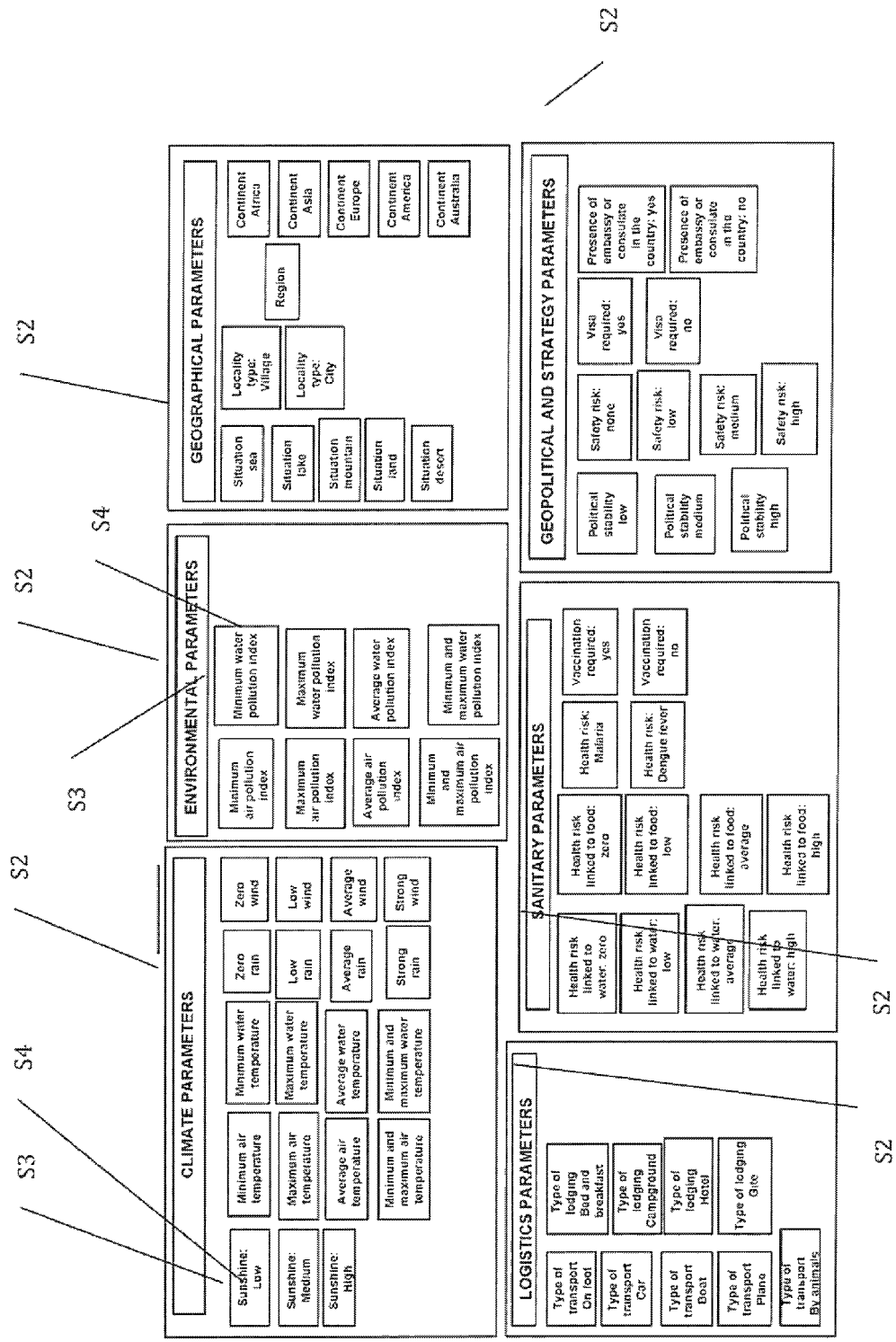
FIG. 2 is a diagram showing the structure of the data sub-sets on six types of resources.
Figure 3:
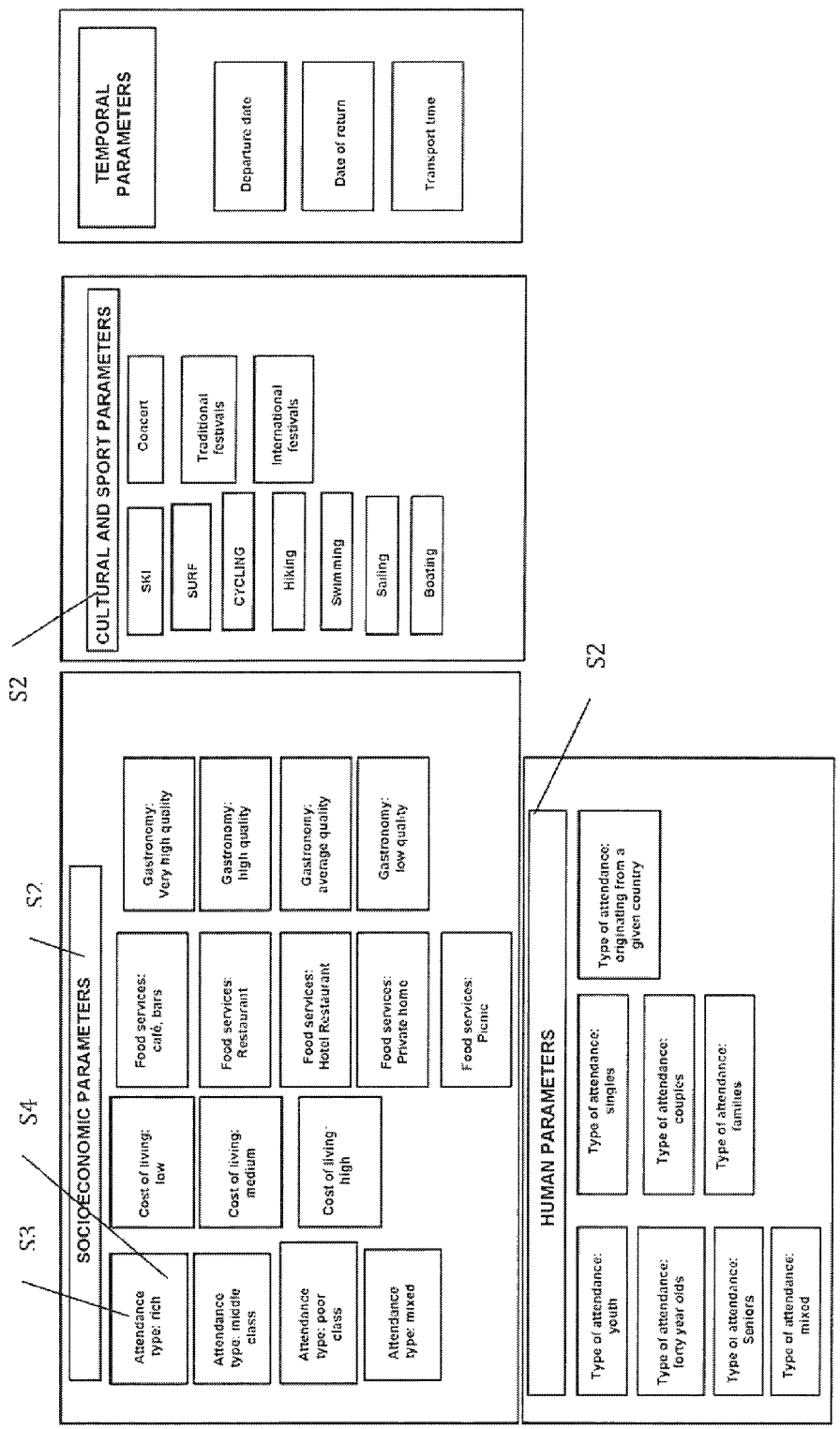
FIG. 3 is a diagram showing the structure of the data sub-sets on three other types of resources.

The drawings of FIGS. 2 and 3 show steps S2, S3 and S4.

The analysis and interpretation of the free request at the level of the client computer is performed by searching for relevant elements owing to the presence in the artificial intelligence program of one or more series of scripts making it possible to identify character strings responding to a univocal descriptive syntax. For each relevant element identified, the client computer generates the conditions for the search request, selection and sorting in the database of the data sub-sets contained in the server computer. The following parts explain how, owing to the existence of a document database, the structure of which is explained, it is possible to search for elements relevant to a user request with an adequate translation.

Thus, on the basis of the structure described above, each data sub-set constitutes a multiplet of seven items, therefore a septuple comprised of S1, S2, S3, S4, S5, S6 and S7, with the following steps:

S1: surface cell;
S2: resource type;
S3: property of the resource;
S4: value of the property;
S5: temporal validity of the value of the property;
S6: date/time of update of this quintuple;
S7: source of said quintuple.

An example of a data sub-set may be:
(Toulouse; Climatic parameter; air temperature; 25° C.; 15 Jun. 2015 2:00 pm-15 Jun. 2015 3:00 pm; Météo-France forecast)

Another example may be:
(Toulouse; Cultural parameter; Gastronomic reputation; good; 2014; Michelin Guide).

An example of a search for relevant elements in the text of the free request (at the level of the client computer) is described below:

Thus, for a free request of the user worded as follows:
"I would like to go to a place with nice weather with a temperature of 25° C. with good gastronomy."

A series of scripts makes it possible to identify character strings responding to a univocal descriptive syntax. The simplest case concerns the character strings "Nice weather" or "good gastronomy".

A more complex case concerns the temperature. It is detected in the text when a series of numbers precedes the strings "° C." or "° F." or "° K".

The translation into requests on the data sub-sets is described below.

For each relevant element identified, conditions are generated for the search request in the database for the data sub-sets.

Example 1 the relevant element "nice weather" is converted into the following condition:
S3="Air temperature" AND S4>=20° C.

Example 2 the relevant element "good gastronomy" is converted into the following condition:
S3="Reputation for gastronomy" AND (S4="good" OR S4="superior" OR S4="excellent").

The syntaxes of elements of conditions of requests presented above are known in SQL (structured query language"

and NoSQL (database management system that is not based on the conventional architecture of relational bases) databases.

The invention makes it possible to obtain a response in less than one minute.

One of the responses to this free request may be:

"Toulouse, France; air temperature; 25°; 15 Jun. 2015 2:00 pm-30 Jun. 2015 3:00 pm".

It is understood that the process and the device have been described and illustrated for the purpose of disclosure rather than limitation. Of course, various arrangements, modifications and improvements may be made to the above example without going beyond the scope of the invention.

The invention claimed is:

1. A process for reverse searching configured to enable a user, at any institution or organization (civil or military) to locate and choose a place in the entire world to stay temporarily, or work, without knowing in advance the name of said place, the process comprising:
   the user formulating a request in natural language on at least one client computer wishes or desires of what the user would like to encounter, see, feel, live or do in the place,
   the wishes or desires including the value of each of a climatic, socioeconomic, political, military, safety, sanitary, environmental, geographical, logistics, and temporal parameter;
   the value of each parameter having associated qualitative values and/or quantitative values,
   the client computer having artificial intelligence for analysis and interpretation of the request in natural language enabling the client computer to interact with the user;
   the client computer being connected by a digital network to at least one server unit;
   the at least one server unit containing stored data coming from sensors associated with at least one surface cell;
   the at least one surface cell being selected from a plurality of cells formed by spatially cutting of the earth's surface into cells;
   the sensors measuring the value of the climatic, sanitary, and environmental parameters associated with the surface cells, the value of parameters being transmitted to the at least one server unit to become the stored data;
   the client computer's artificial intelligence program performing analysis and interpretation of the request in natural language and generating key-words and conditions for searching, selecting and sorting the stored data;
   using the key-words and conditions to search the stored data to locate specific surface cell(s);
   and suppling to the user on client computer place(s) corresponding to the specific surface cell(s) located.

2. The process according to claim 1, wherein place(s) corresponding to the surface cells found are provided to user on the client computer in the form of text, animated or still images, sound, and/or representations.

3. The process according to claim 1, wherein the data coming from the sensors associated with surface cells are stored in the server unit in combination with the socioeconomic, political, military, safety, geographical, logistics, and temporal parameter data.

4. The process according to claim 1, wherein the climatic parameters are selected from the group consisting of sunshine, air temperature, water temperature, wind velocity, and rain level.

5. The process according to claim 4 wherein the at least one cultural or sports parameter is selected from the group consisting of ski, surf, cycling, hiking, swimming, boating, sailing, music concert, traditional festivals, and international festivals.

6. The process according to claim 1, wherein the environmental parameters are air pollution and water pollution.

7. The process according to claim 1, wherein the geographical parameter is selected from the group consisting of location in relation to sea, lake, mountain, desert, village, city, country, and continent localization.

8. The process according to claim 1, wherein the sanitary parameter is selected from the group consisting of health risk linked to water, health risk linked to food, health risk linked to malaria, health risk linked to dengue fever, and vaccination required.

9. The process according to claim 1, wherein the geopolitical parameter is selected from the group consisting of political stability, safety risk, visa requirement, and presence of user country embassy.

10. The process according to claim 1, wherein the socioeconomic parameter is selected from the group consisting of wealth of attendees, cost of living, food services, and quality of gastronomy.

11. The process according to claim 1, wherein the wishes or desires further include the value of at least one each of a cultural and sport parameter selected from the group consisting of ski, surf, cycling, hiking, swimming, boating, sailing, music concert, traditional festivals, and international festivals.

12. The process according to claim 1, wherein the wishes or desires further include the value of at least one human parameter selected from the group consisting of type of age attendance (youth, olds, seniors, mixed), single, couples, families, type of attendance originating from user country.

13. The process according to claim 1, wherein the logistics parameter is selected from the group consisting of type of transport (foot, car, boat, aircraft, transport by animals), and type of accommodation (cottage, hotel, bed and breakfast, camping).

14. The process according to claim 1, wherein the temporal parameter is selected from the group consisting of departure date, date of return, and transport time.

* * * * *